(12) United States Patent
Short (10) Patent No.: US 7,599,887 B1
(45) Date of Patent: Oct. 6, 2009

(54) METHOD AND SYSTEM FOR PREPAID ROAMING MINUTES

(75) Inventor: Shannon M. Short, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 873 days.

(21) Appl. No.: 09/943,554

(22) Filed: Aug. 30, 2001

(51) Int. Cl.
*G06Q 20/00* (2006.01)

(52) U.S. Cl. .............. 705/41; 705/39; 705/40; 455/432; 455/42; 455/405; 455/406; 455/407; 455/408; 455/433

(58) Field of Classification Search ......... 455/405–408, 455/432, 433, 42; 705/39, 40, 41
See application file for complete search history.

(56) References Cited

U.S. PATENT DOCUMENTS

| | | | |
|---|---|---|---|
| 6,029,062 A * | 2/2000 | Hanson ...................... 455/408 |
| 6,070,067 A * | 5/2000 | Nguyen et al. ............... 455/407 |
| 6,516,194 B2 * | 2/2003 | Hanson ...................... 455/433 |
| 6,625,438 B2 * | 9/2003 | Hanson ...................... 455/405 |
| 6,650,887 B2 * | 11/2003 | McGregor et al. .......... 455/406 |
| 6,684,072 B1 * | 1/2004 | Anvekar et al. ........... 455/432.1 |

\* cited by examiner

*Primary Examiner*—Nga B. Nguyen
(74) *Attorney, Agent, or Firm*—Turocy & Watson, LLP (57) ABSTRACT

A method and system for prepaying roaming minutes including crediting a user's account with prepaid roaming minutes at a discounted rate. The roaming minutes are subtracted from the user's account when calls are made outside the home calling area defined by the user's calling plan. Software for implementing the method may be implemented in a number of environments, including a computer system accessible remotely or a processor located on the user's telephone.

16 Claims, 4 Drawing Sheets

METHOD AND SYSTEM FOR PREPAID ROAMING MINUTES

FIELD OF THE INVENTION

The invention relates to a system and method for allowing users to prepay roaming minutes for use in a communications network, such as a cellular telephone network.

BACKGROUND

Wireless telephone service providers employ various methods of charging users for telephone usage within a calling network. Typically, users are charged based on factors including the time of day that a call is made or received, the length of the call, the location of the party to whom the call is directed, and the location of the user. A "calling plan" refers to a rate structure or cost structure used by telephone service providers for charging a customer for telephone use. Many calling plans and their associated rate structures are imposed by a telephone service provider and chosen by a user. A particular user's calling plan is typically defined in a contract between the telephone service provider and the user. Telephone service providers typically charge users a periodic fee, normally a monthly fee, under a calling plan for telephone service.

Telephone service providers typically charge users for units of time, or minutes, during which a call is made or received. Although for ease of presentation, the term "minute" is used herein to refer to a unit of time used for telephone network services, other units of time could be substituted. The term "minute" is also often used to refer to a credit of time which may be used by the user to make telephone calls. Telephone service providers offer "minutes" to users for purchase and use.

Based on the calling plan, the telephone service provider charges the user for telephone use at a certain rate or cost structure. As noted above, one factor in determining the rate that the telephone service provider charges the user is the geographic location of the user when a call is made or received. When the user makes or receives calls outside a pre-defined geographic area defined by the calling plan, the user is considered a "roaming" wireless telephone user or a "roamer." A roamer is typically charged an higher per minute rate for any call made while roaming. The geographic area defined by the calling plan in which users receive no roaming charges is often referred to as the "home calling area."

Such calling plans are often used in wireless telephone networks. A detailed discussion of how a wireless telephone network detects when a user is roaming can be found in U.S. Pat. No. 5,610,973 to Comer, which is hereby incorporated by reference.

A wireless telephone service provider typically offers customers the choice of a plurality of calling plans. The telephone service provider typically charges the user a periodic fee, usually a monthly fee, for the wireless service. Each calling plan has a cost structure, i.e., a rate charged per minute of telephone use or a certain number of minutes of telephone use that is included in the periodic fee after which the user is charged a per minute rate. Each calling plan also has a geographic area associated with the plan. If calls are made or received within the geographic area defined by the calling plan, the user is charged according to the normal cost structure of the plan. If calls are made outside the home calling area, a roaming charge is incurred. The roaming charge is typically an extra fee per minute of roaming wireless telephone usage. Calling plans that include a large home calling area relative to other calling plans are typically more expensive than calling plans that include a relatively small home calling area. Examples of relatively large home calling area plans include "national" plans that do not charge roaming fees for domestic calls, e.g., within the United States.

Roaming charges are often much higher than many customers are willing to pay on a regular basis. Many wireless telephone users simply do not use their wireless telephones when they are not within their home calling area because they do not wish to incur roaming charges.

Conventional calling plans have an "all or nothing" approach to charging for a larger home calling area or paying roaming charges. Users who travel frequently are willing to pay a higher fee for a calling plan that includes a relatively large home calling area. These users avoid roaming charges in exchange for choosing a more expensive calling plan. However, users who travel occasionally, but infrequently, are often unwilling to pay a higher fee for a relatively large home calling area. For example, a user who travels outside his or her home calling area once or twice a year is often unwilling to pay a higher fee during the entire year in order to avoid roaming charges during his or her infrequent travels outside the home calling area.

Although an infrequent traveler is often unwilling to pay for a more expensive calling plan with a larger home calling area, the infrequent traveler may want to use his or her wireless telephone during his infrequent trips but be unwilling to pay roaming charges. This situation leads to customer frustration and irritation and represents a lost business opportunity for wireless telephone service providers.

These and other problems are avoided and numerous advantages are provided by the method described herein.

SUMMARY OF THE INVENTION

Methods and systems for obtaining and using prepaid roaming minutes to charge for wireless telephone service outside a home calling area are disclosed. In one embodiment, a system offers the pre-purchase of roaming time to users at a rate that is lower than a roaming charge for use outside the home calling area included in the user's calling plan. The method and system provides for an "in between" rate primarily to provide infrequent travelers the flexibility to use their telephones on an as needed basis while outside the home calling area without switching to a higher cost plan or paying large roaming fees.

In one aspect, a method according to the present invention includes crediting a user's account with prepaid roaming minutes. When calls are made in a roaming area, the telephone service provider subtracts roaming minutes from the user's account. Preferably, the service provider credits roaming minutes to the user's account at a discounted rate. By a "discounted rate" or at a "discount," it is meant that the minutes are sold at a rate that is lower than the rate charged if the user had not prepurchased the minutes. The roaming minutes credited to the user's account are units of time or credits for roaming telephone usage. When the user makes a roaming call, the roaming minutes are used for the call, and the service provider deletes the roaming minutes from the account.

In another aspect, the telephone service provider credits prepaid roaming minutes to the user's account periodically. The prepaid roaming minutes are credited to a user's account periodically upon receipt of a purchase order from the user or on a subscription basis. Alternatively, the roaming minutes are purchased from the telephone service provider on a calling card. In yet another aspect, a code is received by the telephone service provider from the user before the user dials a roaming call.

In still another aspect of the invention, the service provider deletes the roaming minutes after a predefined time. The predefined time after which roaming minutes are deleted may be about six months.

In another aspect, the telephone service provider subtracts roaming minutes from the user's account only when roaming calls are made only if the roaming minutes were credited to the user's account at least a predefined time before the time that the call was made. The predefined time may be about one month.

In yet another aspect, the telephone service provider credits the user's account with a block of prepaid roaming minutes. Preferably, the block of prepaid roaming minutes is in increments of ten minutes.

In still another aspect, the invention relates to a system for prepaying roaming minutes. The system includes a computer and a software program loaded onto the computer. The software program is configured to implement the method described above.

In another aspect, the invention relates to a system for prepaying roaming minutes which includes a telephone. A software program is loaded onto the telephone, and is configured to implement the method described above.

The invention allows a user to prepurchase roaming minutes, and provides additional user flexibility in paying for roaming service. Rather than having to purchase a more expensive calling plan or pay per minute roaming rates, users may prepurchase a set amount of roaming minutes. The roaming minutes may be purchased at a reduced rate, or discount, in comparison to standard per minute roaming rates offered by telephone service providers. Therefore, telephone users who would otherwise be discouraged from using their telephone while roaming due to high roaming rates may choose a more flexible reduced rate prepaid method of paying for roaming telephone service.

These and other advantages will become apparent to those of ordinary skill in the art with reference to the detailed description and drawings.

DETAILED DESCRIPTION OF THE INVENTION

According to an embodiment of the present invention, service providers offer users roaming minutes at reduced rates. The service provider credits a user's account with prepaid roaming minutes. When the user makes a call outside a home calling area defined by the user's calling plan, the service provider subtracts roaming minutes from the user's account. The present invention may be applied to any network, for example, a wireless or wired telecommunications or computer network where users are allowed to connect to the network from various locations. In such a network, a "call" is a user connection to or through the network.

Figure 1:
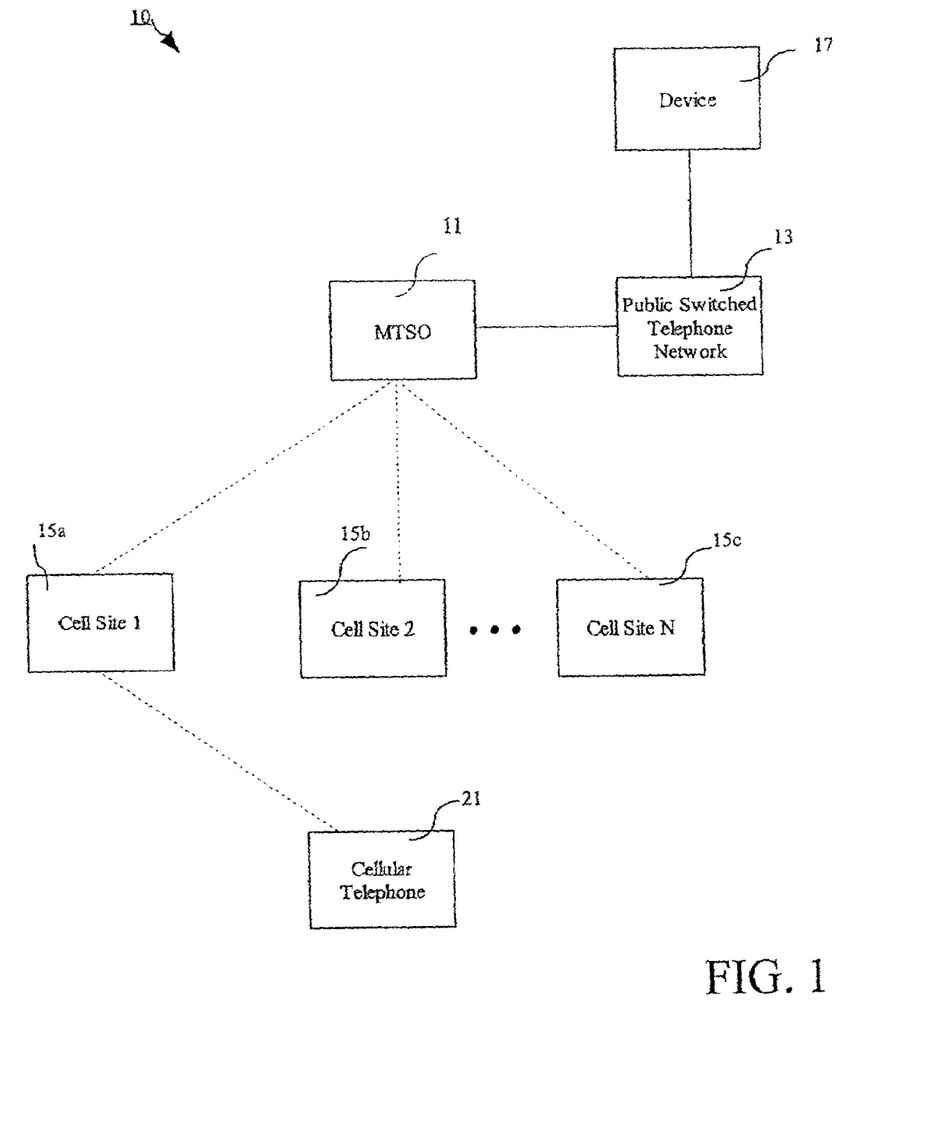
FIG. 1 is a block diagram of an exemplary wireless telephone 110 network.

FIG. 1 shows an exemplary wireless telephone network. An overview of wireless telephone networks is provided in more detail in U.S. Pat. No. 5,850,606 to Bedingfield et al., which is hereby incorporated by reference.

For clarity and ease of presentation, an example of a wireless telephone network has been depicted in FIG. 1. As will be readily appreciated by those of ordinary skill in the art, the invention is applicable to wireless as well as other types of communication networks. For example, the invention is easily modified for use in a computer network. Any number of network configurations may be used to implement the system and method disclosed herein. It is not necessary that a particular wireless or wired telephone network configuration is used.

In the network 10 depicted in FIG. 1, a mobile wireless telephone 21 communicates with other telephones and compatible electronic equipment through one or more mobile telephone switching offices ("MTSO") 11 and cellular sites 15a-15n. The MTSO 11 establishes voice or other communications such as text communications with other telephones and compatible electronic equipment within the coverage area. As is known to those skilled in the art, the wireless telephone 21 passes through various cellular sites 15a-15n under the control of the MTSO 11 based on the geographic movement of the wireless telephone user. Each cellular site 15a-15n contains a transmitter and a receiver for communicating voice and data signals directly to and from the MTSO 11 and the wireless telephone 21 while the wireless telephone 21 is within the transmission range of a particular cellular site 15a. As the wireless telephone 21 is moved outside the range of cellular site 15a, it is transferred to a second cellular site such as cellular site 15b. The MTSO 11 controls the wireless telephone 21 as it passes through the various cellular sites 15a-15n.

The MTSO 11 controls a number of cellular sites and has a geographic range for tracking and monitoring wireless telephones. When the wireless telephone 21 moves outside the range of the MTSO 11, a second MTSO 23, which has control over another number of cellular sites, 25a-n, controls communication with the wireless telephone 21. If the second MTSO 23 is outside the home calling area defined by the user's calling plan, the user is roaming when the wireless telephone 21 moves into the range of MTSO 23.

The MTSO 11 depicted in the network 10 is connected to a public switched telephone network 13. A device 17 is connected to the public switched telephone network 13. Both the connection between the MTSO 11 and the public switched telephone network 13 may be a wired connections or may be wireless connections. The device 17 can be a wireless mobile telephone, or a wired telephone, or any device compatible with the telephone network such as personal computers (PC's) or other electronic devices.

Figure 2:
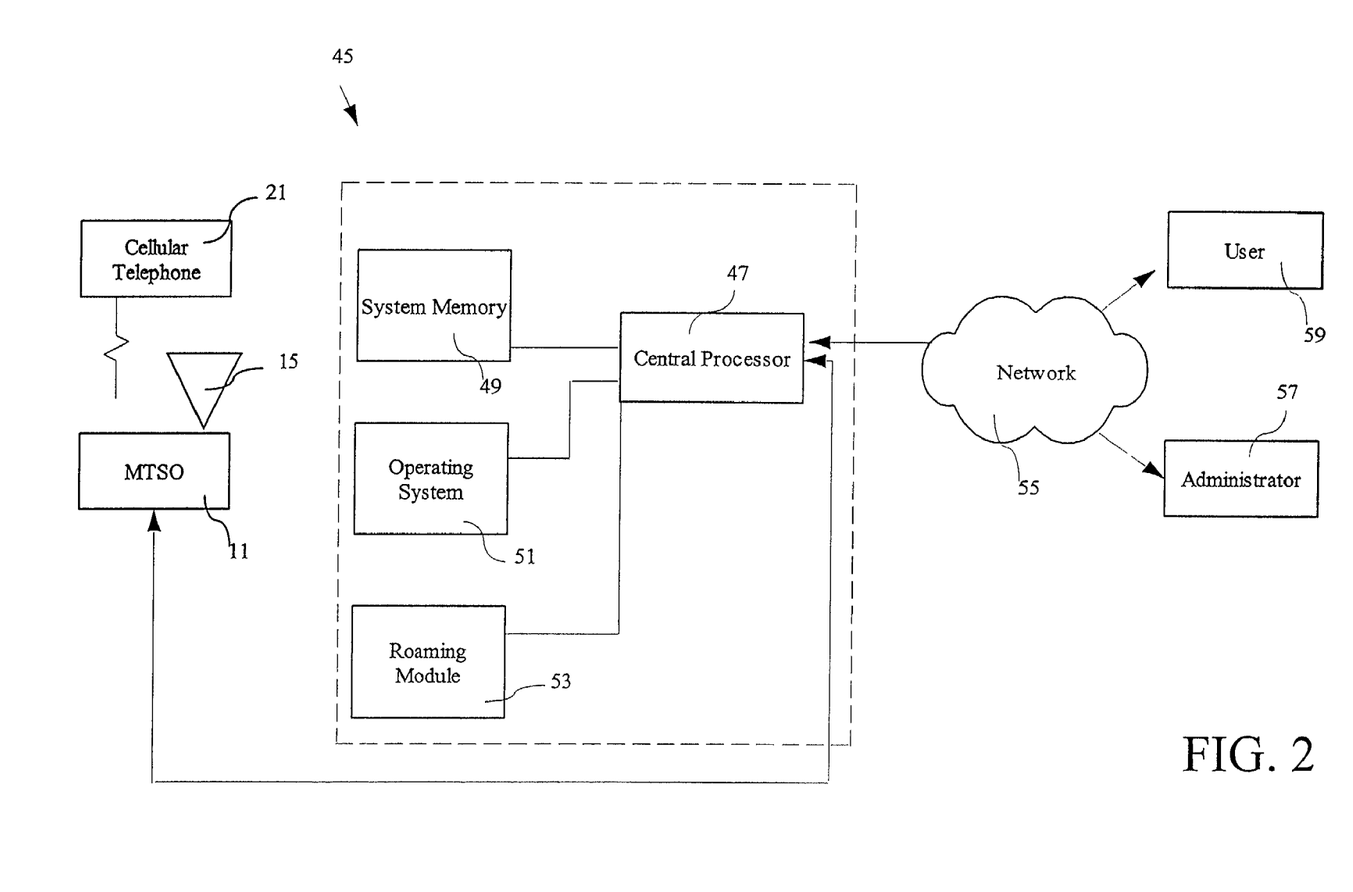
FIG. 2 is a block diagram of an exemplary computer system and telephone network for implementing the invention.

FIG. 2 is a block diagram which depicts an embodiment of a system according to the present invention, which has an MTSO 11 that is in communication with a wireless telephone 21 and a cellular site 15. The wireless telephone 21, MTSO 11 and cellular site 15 may be part of a network of other MTSOs, wireless telephones, and cellular sites, such as the network shown in greater detail in FIG. 1. In the embodiment depicted in FIG. 2, the wireless telephone 21, MTSO 11 and cellular site 15 may be geographically located either outside or inside of the home calling area, depending on how the home calling area is defined by the user's calling plan.

The MTSO 11 is in communication with a computer system 45 through a central processor 47 that resides on the computer system 45. The computer system 45 has system memory 49 for storing data. An operating system 51 is loaded onto the computer system 45 for running and controlling application software. The roaming minutes module 53 is an example of an application that is run by the operating system 51. The roaming minutes module 53 is described in greater detail below.

The central processor 47 of the computer system 45 is in communication with a computer network 55. The computer network 55 allows communication between the computer system 45 and other computer systems or terminals that may be connected to the computer network 55. Examples of terminals that may be connected to the computer network 55 include the user terminal 59 and the administrator terminal 57.

The system depicted in FIG. 2 allows data such as call information, voice transmissions, and text messages, from the wireless telephone 21 to be transmitted from the cellular site 15 and an MTSO 11 to a computer system 45. The data is stored in the system memory 49, and/or processed by the roaming minutes module 53, which is run and controlled by the operating system 51. The central processor 47 communicates the data or other information derived from the data to a computer network 55, where it may be accessed at a user terminal 59 or an administrator terminal 57. Thus, a user or administrator can track the usage of the wireless telephone 21 from the user terminal 59 or administrator terminal 57, respectively.

In an embodiment of a system for implementing a method according to the present invention, the roaming minutes module 53 comprises a software program for storing and tracking the user's roaming minutes. The network system depicted in FIG. 2 is an example of the environment in which the roaming minutes module is operated. As would be understood by one of ordinary skill in the art, alternative networks may be implemented. In an alternative embodiment, the computer system 45 and the user terminal 59 could be a single computer, which receives and processes the data (using the roaming minutes module 53) from the wireless telephone 21 directly. In another embodiment, a telephone network is substituted for the computer network 55 and a telephone is substituted for the user terminal 59. The user dials a telephone number, which connects the user to a voice mail system through a telephone network. Information from the computer system 45 is communicated to the user through the voice mail system, which may be a conventional voice mail service. In yet another embodiment, the wireless telephone 21 contains a processor chip that runs the roaming minutes module 53 on the wireless telephone itself. In this embodiment, the wireless telephone 21 has a display through which the user can access information about calling usage processed by the roaming minutes module 53. Thus, the computer network 55, computer system 45 and user and administrator terminals 59 and 57 are eliminated.

Figure 3:
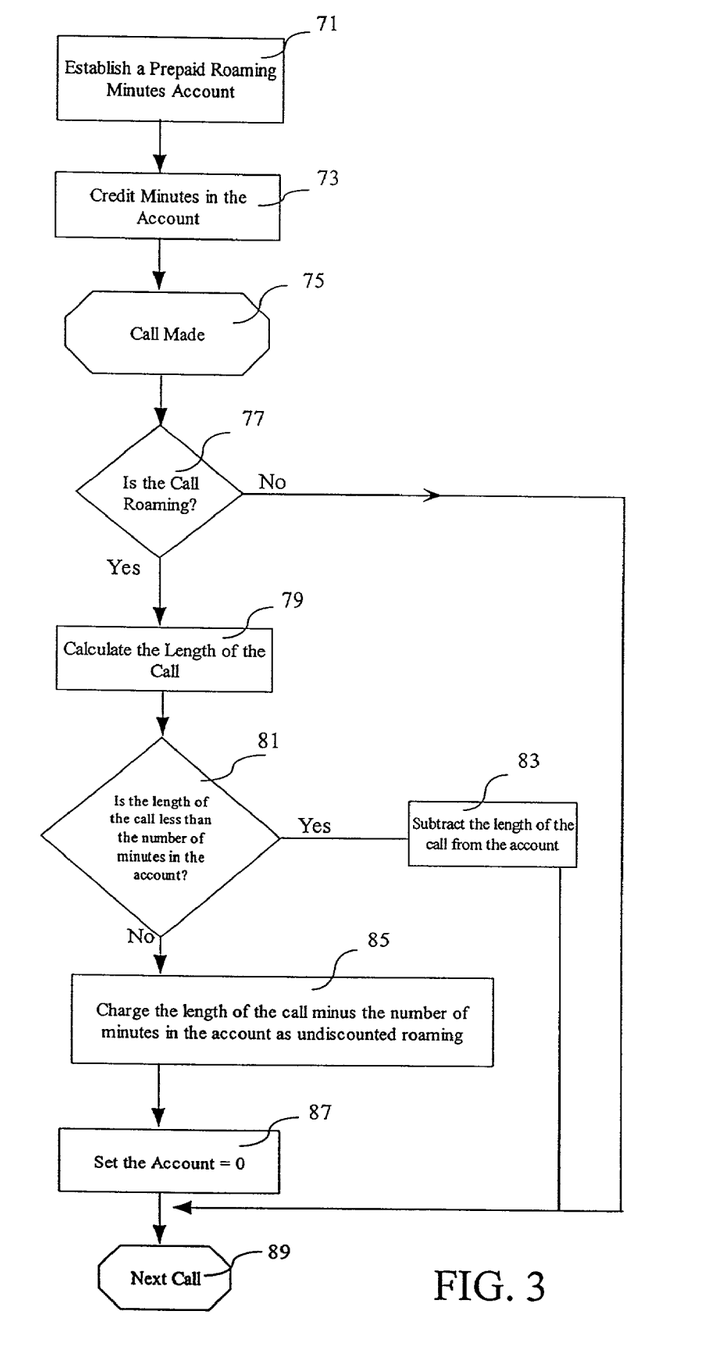
FIG. 3 is the flow of an embodiment of a method according to the present invention.

One embodiment of the flow of the roaming minutes module 53 shown in FIG. 2 is depicted in FIG. 3.

At step 71, the roaming minutes module establishes a prepaid roaming minutes account, referred to herein as "the account" or "the roaming account." In the embodiment shown, the roaming account comprises software construct for storing information about the roaming minutes for which the user has purchased prepaid roaming minutes. The roaming minutes module may be configured to receive a purchase order from a user to purchase prepaid roaming minutes. The software construct may be a variable. Each time the user purchases prepaid roaming minutes, the number of minutes purchased is added to the variable. Each time roaming minutes are used in a roaming telephone call, the roaming minutes used are subtracted from the user's account.

The user purchases prepaid roaming minutes by sending a purchase order to the system. The prepaid roaming minutes are credited to the account at step 73. Preferably, the minutes are credited to the account at a discounted rate. More preferably, the discounted rate is proportional to the number of minutes purchased, i.e., if more minutes are purchased, the rate goes down. The prepaid roaming minutes may be credited to the account periodically, such that the number of minutes is increased. The prepaid roaming minutes may be credited to the account as requested by a user. The computer system 45 in FIG. 2 may be configured to receive a purchase order from the user. The account information stored by the roaming minutes module includes a software construct for tracking the number of roaming minutes in the account. The user may purchase the prepaid roaming minutes using various methods. In the embodiment shown, the user accesses the user's account from the user terminal 59 shown in FIG. 2. A user interface of the user terminal 59 allows the user to enter a payment method, such as a credit card number, and purchase roaming minutes which are credited to the account at step 73. In another embodiment, the user purchases a code, for example, on a calling card. The prepaid roaming minutes may be offered for sale in blocks of time. In one embodiment, the user is sold a block of prepaid roaming minutes in increments of ten minute blocks. In another embodiment, the user accesses the system and is notified of the number of minutes remaining in the account. This information may be communicated to the user from the user terminal 59 in FIG. 2 or from the user's telephone 21.

Before making a roaming call, the user enters the code. In one embodiment, the wireless telephone notifies the user when the call is roaming, and prompts the user to enter the code. The wireless telephone communicates the code to the roaming minutes module, which then credits the account at step 73. Currently, calling cards are used to pre-purchase telephone or long-distance time that can be used from any wireless or wired telephone. This embodiment is in some aspects analogous to conventional calling cards. The calling card has information that may be entered into a voice mail system or computer system manually with a code or through a magnetic strip or similar method. This information connects the user to its account, which is then debited for the call. In another embodiment, the user's wireless calling plan includes a given number of prepaid roaming minutes, which are credited to the account at step 73.

For each telephone call made by the user at step 75, the roaming minutes module queries the network or information received about the call to determine at step 77 if the call is roaming. If the call is not roaming, the roaming minutes module does nothing and waits for the next call at step 89.

If the call is a roaming call, the roaming minutes module calculates the length of the call at step 79. The wireless telephone communicates the length of the call, or the start and stop times which can be used to calculate the length of the call, to the roaming minutes module.

At step 81, the roaming minutes module queries whether the length of the call is less than the number of roaming minutes in the account. It is possible for a user to make a call that is longer than the number of minutes in the account. In this situation, the user is charged the undiscounted roaming rate for any time over the number of minutes in his or her account. Therefore, if the length of the call is less than the number of minutes in the account at step 81, the roaming minutes module subtracts the length of the call from the minutes in the account at step 83, and waits for the next call at step 89. In one embodiment, the roaming minutes module only subtracts the length of the call from the minutes in the account if the minutes were purchased a predefined time from when the call was made. This feature prevents users from purchasing prepaid roaming minutes immediately before making a telephone call. Preferably, the predefined time is about one month. However, if the length of the call is not less than the number of minutes in the account, at step 85, the roaming minutes module records the length of the call minus the number of minutes in the account as undiscounted roaming. The undiscounted roaming may be charged to the user on his or her next bill. The account is set to zero at step 87 because the length of the call exceeded the number of minutes in the account. The roaming minutes module then waits for the next call at step 89.

Figure 4:
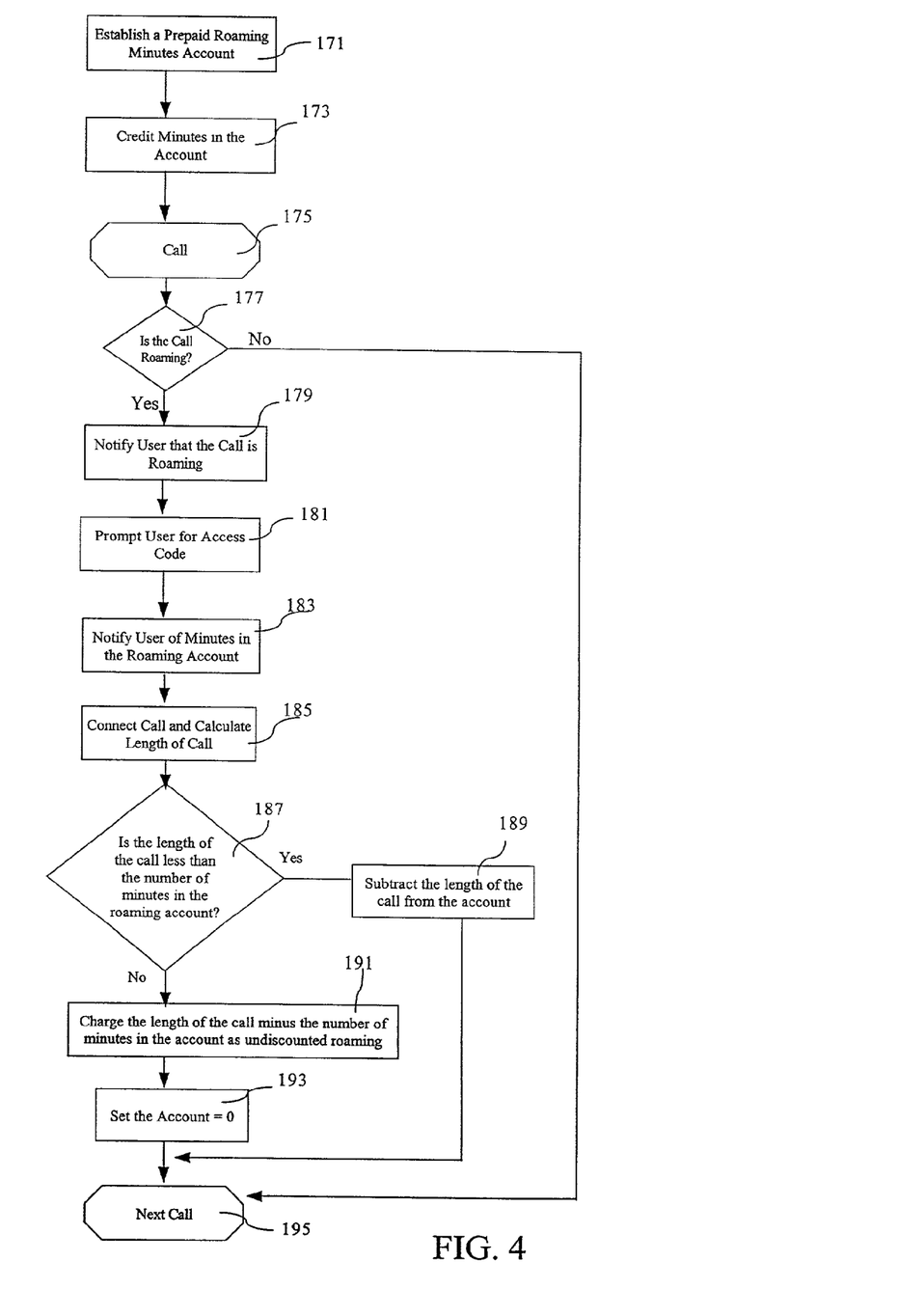
FIG. 4 is an alternative embodiment of a method according to the present invention.

Another embodiment of the flow of the roaming minutes module is depicted in FIG. 4. A prepaid roaming minutes account is established at step 171. Minutes are credited to the account at step 173. The minutes may be purchased by the user with any of the purchasing methods described previously. For each call at step 175, the roaming minutes module queries if the call is roaming at step 177. If the call is not roaming, the roaming minutes module takes no action and waits for the next call at step 195.

If the call is a roaming call, the user is notified that the call is roaming at step 179. Preferably, the user is notified that the call is roaming by a message or noise on the user's wireless telephone. Alternatively, the user may be notified by accessing his or her account by voice mail or through a computer network, such as a global computer network, or Internet.

At step 181, the user is prompted for an access code. The access code is a feature most relevant to the method of purchasing roaming minutes on a calling card, but may be used with other purchasing methods. The access code corresponds to data that informs the roaming minutes module regarding the account information. For example, the roaming minutes module could include a list of access codes corresponding to a certain number of minutes. This information can be updated by conventional applications run on a computer system similar to applications used to track calling card information.

At step 183, the user is notified of the number of minutes in the roaming account. The notification in step 183 is preferably given through a display on the user's wireless telephone. Alternatively, the user may be given access to the user's roaming account information from a terminal on a computer network, such as the user terminal 59 as depicted in FIG. 2. The notification of the number of minutes in the roaming account at step 183 is a feature that can be used regardless of the method by which the user purchased roaming minutes.

At step 187, the roaming minutes module queries whether the length of the call is less than the number of roaming minutes in the account. If the length of the call is less than the number of minutes in the account at step 187, the roaming minutes module subtracts the length of the call from the minutes in the account at step 189, and waits for the next call at step 195. If the length of the call is not less than the number of minutes in the account, at step 187, the roaming minutes module charges the length of the call minus the number of minutes in the account as undiscounted roaming at step 191. The undiscounted roaming may be charged to the user on his or her next bill. The account is set to zero at step 193 because the length of the call exceeded the number of minutes in the account. The roaming minutes module then waits for the next call at step 195.

Example 1

The invention will be further illustrated by the following example.

A telephone service provider offers two calling plans to users in the State of Georgia. The telephone service provider charges $30 per month for the first plan. In exchange for the monthly fee, the telephone service provider provides the user with a connection to a telephone network, such as the network described in FIG. 1. The first calling plan defines the home calling area as the State of Georgia. The user is considered roaming if the user is outside the State of Georgia. The telephone service provider charges a rate of $0.30 per minute for telephone usage within the home calling area. Calls made outside the home calling area cost $0.30 per minute plus a roaming charge of $0.70 per minute. Therefore, if the user uses the telephone outside of Georgia, the telephone service provider charges $1.00 per minute.

The telephone service provider charges $50 per month for a second calling plan. The second plan also provides a connection to a telephone network, such as the network shown in FIG. 1. However, the second plan defines a home calling area as the entire United States. The telephone service provider charges a rate of $0.30 per minute for any call made in the home calling area.

A particular user lives in Georgia and only travels outside of Georgia about twice a year. The user purchases the first calling plan.

The telephone service provider offers prepaid roaming minutes to the user. Referring to FIG. 2, the user purchases prepaid roaming minutes from a user terminal 59 connected by a computer network 55 to a computer system 45. The user notifies the computer system 45 of the number of prepaid roaming minutes that the user wishes to purchase. The telephone service provider offers 30 prepaid roaming minutes for $6.00 ($0.20 per minute). The user purchases 60 minutes of prepaid roaming for $12.00. The roaming minutes module 53 processes the prepaid roaming minutes as shown in FIG. 3.

In FIG. 3, the roaming minutes module establishes a prepaid roaming minutes account at step 71. The roaming minutes module credits 60 minutes into the account at step 73. The user makes a ten minute roaming call from California at step 75. The roaming minutes module determines from the user's location that the call is roaming. Referring to FIG. 2, the user's location is reported to the computer system 45 from the MTSO 11, which receives the telephone call from the telephone 21 through the cellular site 15. The MTSO 11 notifies the central processor 47 of the user's location, and the central processor sends the location information and other information about the telephone call, such as the length of the call, to the roaming minutes module 53.

Referring back to FIG. 3, the roaming minutes module determines that the call is roaming at step 77, and calculates the length of the call at step 79. The call is ten minutes long, and there are 60 minutes in the user's account. Because the call is less than the number of minutes in the account at step 81, the length of the call is subtracted from the roaming minutes account, and the roaming minutes module awaits the next call at step 89. Therefore, at the end of the call, the user has 50 minutes remaining in the account. The user may repeat the steps in FIG. 3 for additional calls.

The user is therefore able to prepay for roaming service at a reduced rate without having to purchase a more expensive calling plan.

Example 2

The invention will be further illustrated by the following example. The following example illustrates a roaming call that exceeds the prepaid roaming minutes that a user has purchased. In this example, the telephone service provider offers the same two calling plans and prepaid roaming minutes described in Example 1 for users in Georgia. The home calling area is the State of Georgia.

The user purchases the first plan for $30 per month, and is connected to a network. The user purchases 60 minutes of prepaid roaming for $12.00. The roaming minutes module 53 in FIG. 2 establishes a prepaid roaming minutes account at step 71 in FIG. 3, and credits 60 minutes into the account.

Referring again to FIG. 3, the user makes a 70 minute roaming call in California at step 75. Because the call is roaming at step 77, the roaming minutes module calculates the length of the call at step 79. The length of the call is greater than the number of minutes in the account at step 81. The roaming minutes module then proceeds to step 85, where it charges the length of the call (70 minutes) minus the number of minutes in the account (60 minutes) as undiscounted roaming. Therefore, in addition to the $0.30 per minute service fee, the user pays $0.70 per minute roaming fee for then ten minutes that the call exceeded the roaming minutes in the account. The roaming charges for the 70 minute roaming call cost $12.00 for the first 60 minutes of prepaid roaming and $7.00 for the last ten minutes for a total of $19.00. The account is reset to zero at step 87, and the roaming minutes module awaits the next call at step 89.

It will be apparent to those with skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, including wireless and computer networks, or other networks supporting electronic devices. There are similarly many ways that independent programmers might provide software to provide the functionality associated with the present invention as taught herein without departing from the spirit and scope of the invention. Having thus generally described the invention, the same will become better understood from the following claims in which it is set forth in a non-limiting manner.

That which is claimed:

1. A method for prepaying roaming minutes, comprising:
  employing a processor to execute the prepaying of roaming minutes, comprising:
  crediting a user's account with prepaid roaming minutes purchased by a user, the prepaid roaming minutes comprising units of time for telephone usage outside of a home calling area defined by a user's calling plan, wherein the user's calling plan includes a roaming charge for the prepaid roaming minutes and wherein the home calling area comprises one of a plurality of predefined geographical areas each of which is within a larger predefined geographical area comprising a national calling area;

receiving one of a plurality of access codes before dialing a roaming call, each of the plurality of access codes corresponding to a certain number of the prepaid roaming minutes;

notifying the user of the number of prepaid roaming minutes in the user's account via a display on a wireless telephone associated with the user;

determining whether the prepaid roaming minutes were purchased at a time greater than a predefined time before a call is made, wherein the prepaid roaming minutes are purchased at a discounted rate, wherein the discounted rate is lower than the roaming charge included in the user's calling plan, and wherein the prepaid roaming minutes are subtracted from the user's account at the discounted rate when the prepaid roaming minutes were purchased at a time greater than the predefined time and when the call is made outside the home calling area defined by the user's calling plan; and determining whether the length of the roaming call is greater than the number of prepaid roaming minutes in the user's account, wherein the difference between the length of the roaming call and the number of prepaid roaming minutes in the user's account is charged as undiscounted roaming when the length of the roaming call is greater than the number of prepaid minutes in the user's account.

2. The method of claim 1, further comprising:
  crediting prepaid roaming minutes at a discounted rate.

3. The method of claim 1, further comprising:
  crediting prepaid roaming minutes at a discounted rate proportional to the time purchased.

4. The method of claim 1, further comprising:
  crediting a user's account with prepaid roaming minutes periodically.

5. The method of claim 1, further comprising:
  receiving a purchase order for roaming minutes from a user.

6. The method of claim 1, further comprising:
  deleting the roaming minutes after a predefined time.

7. The method of claim 6, wherein the predefined time is about six months.

8. The method of claim 1, wherein the predefined time is about one month.

9. The method of claim 1, wherein crediting further comprises:
  crediting a user's account with a block of prepaid roaming minutes.

10. The method of claim 9, wherein the block of prepaid roaming minutes is in increments of at least about 10 minutes.

11. A telephone system for prepaying roaming minutes, comprising:
  a memory for storing executable program code; and
  a processor, functionally coupled to the memory, the processor being responsive to computer-executable instructions contained in the program code and operative to:
  credit a user's account with prepaid roaming minutes at a discounted rate, the prepaid roaming minutes comprising units of time for telephone usage outside of a home calling area defined by a user's calling plan, wherein the user's calling plan includes a roaming charge for the prepaid roaming minutes and wherein the home calling area comprises one of a plurality of predefined geographical areas each of which is within a larger predefined geographical area comprising a national calling area, wherein the discounted rate is lower than the roaming charge included in the user's calling plan;

receive one of a plurality of access codes before dialing a roaming call, each of the plurality of access codes corresponding to a certain number of the prepaid roaming minutes;

notify the user of the number of prepaid roaming minutes in the user's account via a display on a wireless telephone associated with the user;

determine whether the prepaid roaming minutes were purchased a predefined time before a call is made, wherein the prepaid roaming minutes are purchased at a discounted rate, wherein the discounted rate is lower than the roaming charge included in the user's calling plan, and wherein the prepaid roaming minutes are subtracted from the user's account at the discounted rate when the prepaid roaming minutes were purchased at a time greater than the predefined time and when the call is made outside the home calling area defined by the user's calling plan; and determine whether the length of the roaming call is greater than the number of prepaid roaming minutes in the user's account, wherein the difference between the length of the roaming call and the number of prepaid roaming minutes in the user's account is charged as undiscounted roaming when the length of the roaming call is greater than the number of prepaid minutes in the user's account.

12. The telephone system of claim 11, wherein the processor is operative to allowing the user to access the account over a computer network.

13. The telephone system of claim 11, wherein the processor is further operative to protect the account with a password.

14. The telephone system of claim 12, wherein the user's account is accessed over the computer network using voice mail.

15. The telephone system of claim 11 further comprising, a wireless telephone.

16. The system of claim 11 further comprising, a digital telephone.

* * * * *